United States Patent
Grasser

(10) Patent No.: US 7,817,323 B2
(45) Date of Patent: Oct. 19, 2010

(54) OPTICAL STRUCTURE AND AN IMAGING SYSTEM USING THE SAME

(75) Inventor: Regis Grasser, Mountain View, CA (US)

(73) Assignee: Texas Instruments Incorporated, Dallas, TX (US)

( * ) Notice: Subject to any disclaimer, the term of this patent is extended or adjusted under 35 U.S.C. 154(b) by 375 days.

(21) Appl. No.: 11/856,010

(22) Filed: Sep. 14, 2007

(65) Prior Publication Data
US 2009/0009837 A1 Jan. 8, 2009

Related U.S. Application Data

(60) Provisional application No. 60/947,618, filed on Jul. 2, 2007, provisional application No. 60/953,409, filed on Aug. 1, 2007.

(51) Int. Cl.
*G02B 26/08* (2006.01)
(52) U.S. Cl. .................................... 359/216.1
(58) Field of Classification Search .............. 359/216.1, 359/217.1, 217.2, 218.1; 353/31
See application file for complete search history.

(56) References Cited

U.S. PATENT DOCUMENTS

| | | | |
|---|---|---|---|
| 4,715,697 A | 12/1987 | John et al. | |
| 4,918,583 A | 4/1990 | Kudo et al. | |
| 5,347,433 A | 9/1994 | Sedlmayr et al. | |
| 5,410,370 A | 4/1995 | Janssen et al. | |
| 6,644,814 B2 | 11/2003 | Ogawa et al. | |
| 6,935,749 B2 | 8/2005 | Kato et al. | |
| 2002/0159036 A1* | 10/2002 | Yamagishi et al. | 353/31 |
| 2006/0098128 A1 | 5/2006 | Conner et al. | |

FOREIGN PATENT DOCUMENTS

WO     WO-0079340     12/2000

* cited by examiner

*Primary Examiner*—Euncha P Cherry
(74) *Attorney, Agent, or Firm*—Charles A. Brill; Wade James Brady, III; Frederick J. Telecky, Jr.

(57) ABSTRACT

An optical architecture comprises an optical scanning mechanism for use in imaging systems. With the optical scanning mechanism, illumination light from an illuminator can be directed to a target so as to generate an illumination field. The generated illumination field can be moved across the target so as to sequentially illuminate the image area on the target.

20 Claims, 9 Drawing Sheets

OPTICAL STRUCTURE AND AN IMAGING SYSTEM USING THE SAME

CROSS-REFERENCE TO RELATED CASES

This US patent application claims priority under 119(e) from U.S. provisional patent application Ser. No. 60/947,618 filed Jul. 2, 2007, the subject matter being incorporated herein by reference in its entirety.

This US patent application also claims priority under 119(e) from U.S. provisional patent application Ser. No. 60/953,409 filed Aug. 1, 2007, the subject matter being incorporated herein by reference in its entirety.

This US patent application is related to US patent application "An Optical Architecture" to Grasser, 11/856,004; and "An Optical Architecture having a Rotating Polygon for Use in Imaging Systems" to Destain, 11/856,012, both filed on the same day as this application; and the subject matter of each being incorporated herein by reference in its entirety.

TECHNICAL FIELD OF THE DISCLOSURE

The technical field of this disclosure relates to the art of optical devices and architectures in imaging systems; and more particularly to the art of optical structures with scrolling-illumination capabilities and imaging systems using the same.

BACKGROUND OF THE DISCLOSURE

In current imaging systems using light valves each having an array of individually addressable pixels, color images are produced by field-sequential illumination techniques. For example, red, green, and blue colors of illumination light from an illumination system are sequentially incident onto the light valve. The light valve modulates different colors of light separately at different times; and the modulated colors of light are overlapped on a screen so as to form the desired color images on the screen. Due to the sequential illumination, illumination light of single color is incident to the light valve and arrived at the screen at a time; while other colors of light are blocked from reaching the light valve and the screen. As a result, the brightness of the produced color images on the screen is reduced.

Field-sequential illumination techniques may cause other problems, especially in imaging systems using solid-state illuminators such as lasers and light-emitting-diodes (LEDs). It has been observed that solid-state illuminators can output maximal light intensity when operated continuously; while the output light intensity may not be maximal at an intermittent mode. Therefore, when used with a field-sequential technique, the solid-state illuminators are operated at an intermittent mode, resulting in degraded output intensity, which in turn, degrades the brightness of the produced color images on the screen.

SUMMARY

In one example, an imaging system is disclosed herein. The system comprises: a target to be illuminated by an illumination light comprising first and second color components of different colors; and an illumination system providing the illumination light, further comprising: first and second illuminators respectively providing the first and second color components; a scanning mechanism that is capable of causing an illumination field on the target and moving the illumination field across the target; and wherein the illumination field on the target comprises first and second color sub-fields corresponding to the first and second color components of the illumination light.

In another example, an illumination system is disclosed herein. The system comprises: first and second illuminators for respectively providing first and second light components of different colors; a scanning mechanism that is capable of causing an illumination field on the target and moving the illumination field across the target; and wherein the illumination field on the target comprises first and second color sub-fields corresponding to the first and second color components of the illumination light.

In yet another example, a method of displaying a color image on a screen is disclosed herein. The method comprises: providing an illumination light having first and second light components of different colors; illuminating a light valve having an array of individually addressable pixels, further comprising: generating an illumination field comprising first and second color sub-fields on the light valve, said first and second color sub-fields corresponding to the first and second color light components; and moving the illumination field across the light valve so as to sequentially illuminating the light valve pixels; modulating the first and second color light components according to a set of image date associated with the color image; and projecting the modulated light onto the screen.

In still yet another example, a display system is disclosed herein. The system comprises: an illuminator providing light; an optical element for focusing the light onto a movable reflective mirror, wherein the reflective mirror is capable of a) reflecting the light onto a light valve having an array of individually addressable pixels so as to cause an illumination field on the light valve at a time; and b) moving the illumination field across the light valve as the reflective mirror moves; and wherein the illuminator and the light valve are disposed on the same side of the optical element; and the movable reflective mirror is on the opposite of the optical element.

In yet another example, a method of displaying an image on a screen is disclosed herein. The method comprises: providing light; focusing the light onto a movable mirror that reflects the light using an optical element; projecting the reflected light from the movable mirror onto a light valve by said optical element; moving an illumination field caused by the reflected light from the mirror across the light valve so as to sequentially illuminating the light valve pixels; modulating the light by the light valve pixels; and projecting the modulated light onto a screen.

In yet another example, a display system is disclosed herein. The system comprises: a light valve that comprises an array of individually addressable pixels; an illumination system capable of generating an illumination field on the light valve and moving said illumination field across the light valve along a scanning direction; wherein the illumination field on the light valve has a height along the scanning direction and a width along a direction perpendicular to the scanning direction; and wherein a ratio of the height of the illumination field to a height of the light valve along the scanning direction is from $\frac{1}{500}$ to $\frac{1}{2}$.

In yet another example, a display system is disclosed herein. The system comprises: an illumination system comprising first and second illuminators for providing first and second color light; a light valve comprising an array of individually addressable pixels for modulating the first and second light so as to generate an image on a screen; and wherein said image on the screen has a brightness that is 2.5 times or more of an image produced by another display system using the same illumination system and the same light valve.

BRIEF DESCRIPTION OF DRAWINGS

FIG. 1b schematically illustrates a top view of an illumination field on the target as illustrated in FIG. 1a;

FIG. 2b schematically illustrates an intensity distribution of the color fields along the length of the illumination field on the target as illustrated in FIG. 2a;

FIG. 3a schematically illustrates an exemplary scanning optical element for use the imaging system in FIG. 1a;

FIG. 3b schematically illustrates a cross-sectional view of an exemplary reflective-polygonal mirror structure that can be used as the scanning optical element of FIG. 3a;

FIG. 11 schematically illustrates an exemplary micromirror device that can be used in the light valve of the imaging system illustrated in FIG. 1a.

DETAILED DESCRIPTION OF SELECTED EXAMPLES

In view of the foregoing, an optical architecture for use in imaging systems is disclosed herein. The optical architecture is capable of producing an illumination field with a desired profile on a target and moving the illumination field across the target so as to illuminate the target. The illumination field may comprise a monochromatic field or multiple color fields. In color display applications wherein the target is a light valve having individually addressable pixels, an optical architecture of this disclosure allows for light of different colors from the illuminators being incident on the light valve, as well as the screen of the display system, at the same time.

In the following, the optical architecture and imaging systems using the same will be discussed with selected examples wherein the imaging system is a display system employing an array of individually addressable pixels of a light valve. However, it will be appreciated by those skilled in the art that the following discussion is for demonstration purpose, and should not be interpreted as a limitation. Other variations within the scope of this disclosure are also applicable. For example, other imaging systems, such as systems for storing information of image (e.g. 2D images or holographic images) in image storing mediums are also applicable.

Figure 1A:
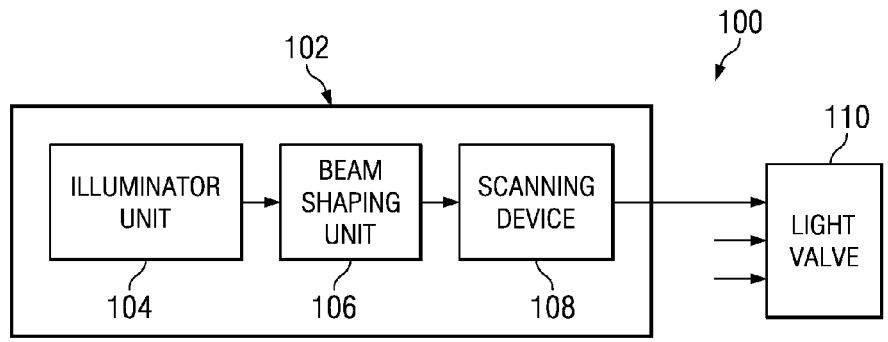
FIG. 1a schematically illustrates an exemplary imaging system comprising an illumination system that is capable of illuminating the target by causing an illumination field on the target and moving the illumination field across the target continuously so as to illuminate the entire image area on the target.

Referring to the drawings, FIG. 1a schematically illustrates an exemplary display system having an optical structure of this disclosure. Display system 100 in this example comprises light valve 110 and illumination system 102 for illuminating the light valve (110).

The light valve (110) comprises an array of individually addressable pixels for causing the incident light toward or away from a display target (e.g. a display screen) by modulating the illumination light so as to produce desired images on a screen (which is not shown for simplicity). The light valve may comprise any suitable light valve pixels, such as reflective and deflectable micromirror devices and liquid-crystal-on-silicon (LCOS) cells, examples of which will be discussed afterwards with reference to FIG. 11. It is noted that, in other applications or system configurations, the light valve can be replaced by other suitable targets, such as a printing target (e.g. a piece of paper) or an image storing medium, depending upon the specific configuration and application of the imaging system.

Illumination system 102 comprises illuminator unit 104 that comprises one or more illuminators for generating illumination light, such as monochromatic light or light of multiple colors. The illuminator of the illumination unit can be of any suitable light emitting devices, such as solid-state illuminators and other narrow-banded illuminators. In one example, the illuminators can be laser sources, such as those of NEC-SEL™ technologies from Novalux, Inc. and solid-state lasers from Collinear Inc. and Coherent Inc. The lasers, when used in the illuminator unit (104), are preferred to have a light power of from 50 mW or higher per color used in the system for producing the image (e.g. the red, green, or the blue color), such as 1 W or higher per color, and more preferably 3 W or higher per color. When multiple laser sources are used for providing sufficient light intensity, it is preferred, though not required, that 5 or more, 10 or more, 17 or more, 24 or more, laser sources (or independent laser units), are used for each color light.

In one example, the illumination light is directed to scanning optical device 108 that projects the illumination light onto the light valve so as to generate an illumination field on the light valve. The generated illumination field is equal to or less than the area of the light valve pixel array. For illuminating the entire light valve pixel array, the scanning device moves the illumination field across the light valve pixel array. The movement of the illumination field across the light valve pixel array can be continuous over time or can be transitional between discrete positions on the light valve pixel array, which will be detailed afterwards with reference to FIG. 1b.

The illumination system (102) may have other desired features, such as beam shaping unit 106. The beam shaping unit (106) can be disposed between the illuminator unit (104) and the scanning device (108) for shaping the illumination light from the illuminator unit into modified light with a desired profile, such as a profile with a desired illumination-field shape and intensity distribution. Examples of the beam shaping unit are set forth in US patent application "An Optical Architecture" to Grasser, 11/856,004, filed on the same day as this US patent application, and the subject matter being incorporated herein by reference in its entirety. Other optical elements, such as light steering optical elements for directing the illumination light, are also applicable; and such light steering elements can be any suitable optical elements, such as regular optical lenses and diffractive optical elements with diffractive gratings.

Figure 1B:
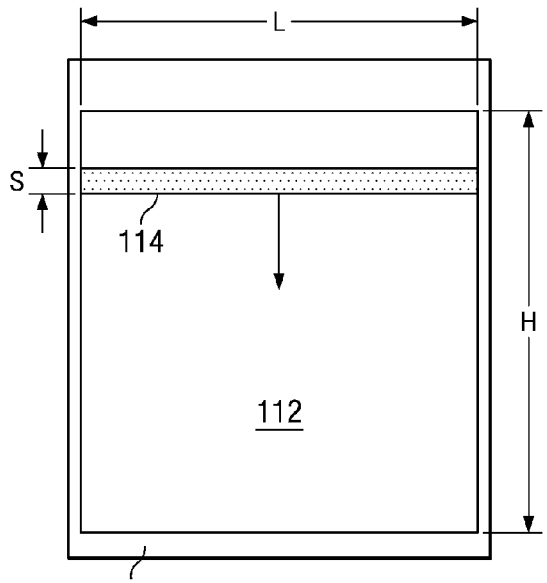

FIG. 1b schematically illustrates the illumination field and the movement of the illumination field across pixel array of the light valve (110). Referring to FIG. 1b, illumination field 114 is generated on pixel array 112 of light valve 110. The light valve pixel array can be characterized by length L and height H. L can be 480 pixels or more, 600 pixels or more, 720 pixels or more, 768 pixels or more, 1024 pixels or more, 1050 pixels or more, 1200 pixels or more, with each pixel having a characteristic length of 200 microns or less, 150 microns or less, 100 microns or less, 50 microns or less, 20 microns or less, 14 microns or less, 8 microns or less. H can be 640 pixels or more, 800 pixels or more, 1024 pixels or more, 1280 pixels or more, 1400 pixels or more, 1600 pixels or more, and 1920 pixels or more, with each pixel having a characteristic width of 200 microns or less, 150 microns or less, 100 microns or less, 50 microns or less, 20 microns or less, 14 microns or less, 8 microns or less. In another example, H can be from 5 mm to 30 mm, such as from 10 mm to 20 mm.

Within the light valve pixel array (112), the illumination field 114 has a specific profile that includes, but not limited to, geometric shape and intensity distributions along different directions. In the example as illustrated in FIG. 1b, the illumination field is a straight strip having a length this is substantially equal to the length of the light valve pixel array L; and a width s. s may have a value such that the ratio of s to L is $1/500$ or higher, such as $1/200$ or higher, $1/100$ or higher, $1/50$ or higher, $1/20$ or higher, or $1/10$ or higher, and preferably less than $1/2$.

Figure 1C:
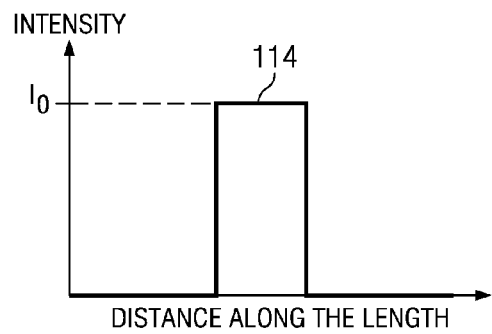
FIG. 1c schematically illustrates an intensity distribution of the illumination field on the target.

The illumination field preferably (though not required) has a substantially uniform intensity distribution along a particular direction, such as along the length of the illumination field, which is perpendicular to the scanning direction, as schematically illustrated in FIG. 1c. In the example as illustrated in FIG. 1b, the illumination field preferably has a uniform intensity distribution along the rows of the light valve pixel array.

Referring to FIG. 1c, illumination field 114 exhibits a substantially square distribution profile with the maximum intensity of $I_0$. The intensity distribution can be obtained by a proper beam shaping unit (e.g. 106 in FIG. 1a) in accordance with the specific configuration of the illuminators, examples of which are set forth in US patent application "An Optical Architecture" to Grasser, 11/856,004, filed on the same day as this US patent application, and the subject matter being incorporated herein by reference in its entirety. In other examples, the illumination field may have other desired intensity distributions and/or shapes of illumination fields. For example, the illumination field (114) may have a Gaussian, triangular, or may other intensity distributions across the width s. Even though it is preferred that the illumination field has a uniform intensity distribution along the length (e.g. along the length L) of the illumination field, the intensity distribution along other directions, such as along the moving direction (e.g. along the width) can be any forms, such as uniform, Gaussian, top-hat, triangle, and random.

Referring again to FIG. 1b, the illumination field (114) is moved across the image area over time. For example, the illumination field can be moved from the top row to the bottom row of the light valve pixel array (112) or inversely. The illumination field can alternatively be generated with the length along the height of the light valve pixel array; and be moved horizontally (e.g. from right to the left or inversely). In other examples, the illumination field can be aligned with the length along any desired directions (e.g. along a diagonal of the image area), and be moved along a direction that may or may not be perpendicular to the length of the illumination field.

The movement of the illumination field can be performed in many desired ways. For example, the illumination field can be moved continuously such that each row of the illumination field continuously sweeps through the rows of the light valve pixel array. Often times, the illumination field has a width larger than the width of single light valve pixel row such that one illumination field generated at one time illuminates multiple light valve pixel rows. With this scheme, the light valve pixel array can be divided into row-blocks; and each row block comprises a number of light valve pixel rows such that with width of a row-block is substantially equal to the width of the illumination field. The illumination field can then be moved on a row-block basis. For example, the illumination field can sequentially sweep through the row-blocks (e.g. illuminate substantially one row-block at one time and illuminate substantially the entire next row-block at another time). Alternatively, the illumination field can be moved to illuminate the odd numbered (or even numbered) row-blocks followed by illuminating the even numbered (or odd numbered) row-blocks; while the even and odd numbered row-blocks are interlaced. In other examples, the illumination field can be moved in many other desired ways to illuminate substantially the entire light valve pixel array.

Regardless different moving schemes, it is preferred (though not required) that the illumination field substantially does not change its illumination profile (e.g. shape and/or intensity distribution) during the movement to different locations.

In color image display applications, light of different colors (wavelengths) may be used to illuminate the light valve pixel array. Each light valve pixel is illuminated by light of single color at a particular time; and modulates the light to generate the corresponding color image component on the screen. The light of different colors sequentially illuminates each light valve pixel; and the light valve pixel sequentially modulates the light of different colors. The generated image components of different colors are then overlapped on the screen to form the desired color image. In accordance with the above illumination scheme, the illumination field may comprise a number of illumination sub-fields of different colors corresponding to the colors of the light selected by the system in producing color images.

It is noted that the system may use any combinations of color light, which results in different combinations of illumination sub-fields. For example, a combination of primary colors can be used, wherein a primary color is a color that is not a combination of other colors. A primary color can be a color selected from red, green, and blue colors. Alternatively, a combination of secondary colors can be used, wherein a secondary color is a color that is a combination of other colors (e.g. primary colors). Examples of secondary colors are yellow, cyan, magenta, and white. In still other examples, a combination of light of one or more primary colors and light of one or more secondary colors can be used for illuminating the light valve so as to produce desired color images. It is noted that, each illumination field may have separate illumination sub-fields of substantially the same color. Among many other examples, an illumination field may have illumination sub-fields of R-G-B, R-G-B-W, R-G-B-Y-C-M, R-G-B-Y-C-M-W, R-R-G-G-B-B, R-R-G-G-B-B-W, or other color combinations; wherein R, G, B, Y, C, and M are respectively red, green, blue, yellow, cyan, magenta, and white colors. For simplicity purpose without losing the generality, the following discussion assumes that an R-G-B color light combination is employed; and the accordingly, the illumination field comprises R, G, and B illumination sub-fields. It will be appreciated by those skilled in the art that the following discussion is for demonstration; and should not be interpreted as a limitation.

Figure 2A:
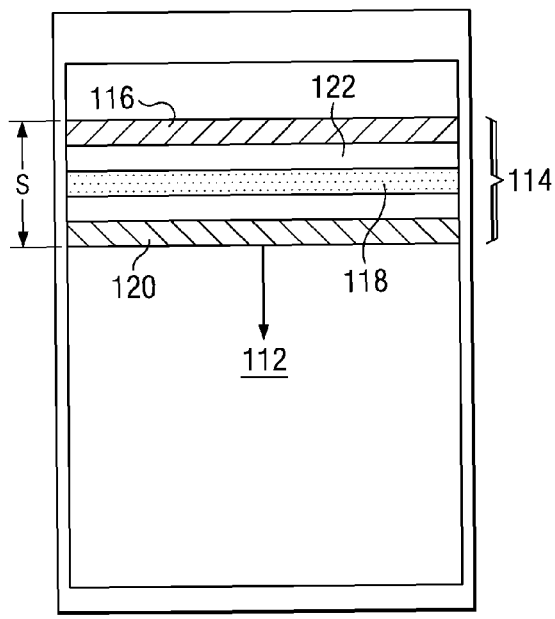
FIG. 2a schematically illustrates a top view of an illumination field on the target as illustrated in FIG. 1a, wherein the illumination field comprises different color fields.

Referring to FIG. 2a, illumination field 114 in this example comprises sub-fields 116, 118, and 120 caused by illumination light of red, green, and blue color light. Adjacent sub-fields can be separated by blank fields, such as blank field 122. A blank field is a field with substantially no illumination light from the illuminator unit. Sub-fields of different colors can be deployed in the illumination field (114) in any desired ways depending upon the optical configuration of the illumination system.

In one example, the illumination sub-fields are equally spaced. Each sub-field preferably has a width ($s_i$) such that the total width of one sub-field and the adjacent blank sub-field (if provided) is substantially the height (e.g. H in FIG. 1b) of the image area on the target. For N illumination sub-fields that are equally spaced with blank sub-fields, the total width of the N illumination sub-fields and the blank sub-fields is preferably H×(1−(½×N)) with H being defined above with reference in FIG. 1b. A blank sub-field between two consecutive illumination sub-fields may be designed to provide a time period during which light valve pixels of a display system can be updated. In particular, the size (width) of a blank sub-field can be determined based on the minimum update (state-switching) time period of light valve pixels.

The illumination sub-fields may have different intensity distributions. However, it is preferred that each illumination sub-field has a substantially uniform intensity distribution along the direction perpendicular to the moving direction. For example, when the sub-fields are rectangular strips along the rows of the pixel array, each sub-field is preferred to have a uniform intensity distribution along the rows of the pixel array; and the sub-fields are moved along the columns of the pixel array, as schematically illustrated in FIG. 2b.

Figure 2B:
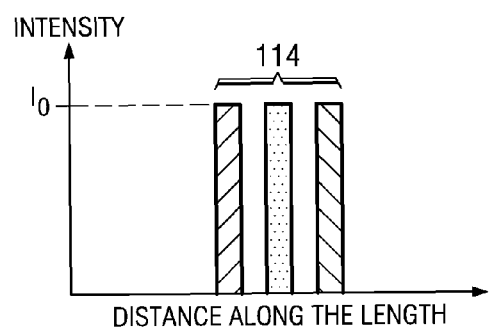

Referring to FIG. 2b, illumination sub-fields of different colors in this example each have a uniform distribution along the length (along the rows of the pixel array). The illumination sub-fields have substantially the same maximum intensity $I_0$. Due to the output power characteristics of the illuminators for light of different colors, illumination sub-fields of different colors may have different maximum output intensities. Each illumination sub-field may have any suitable or desired intensity distributions along other directions. For example, each illumination sub-field may have a uniform, Gaussian, top-hat, triangle, random, or other forms of intensity distributions along the width of the illumination sub-field (along the column).

The illumination sub-fields can be moved across the light valve pixel array in a way of the monochromatic field (114) as discussed above. It is preferred that the relative positions, as well as the intensity distribution, of each sub-field in the illumination field (114) do not change during the movement across the pixel array.

It is noted that the illumination field (114) can also be moved to discrete locations on the light valve pixel array. However, in the presence of blank sub-fields, it is desired to secure that all rows of the pixel array are covered at least once. For example, the illumination field (114) can be moved such that the illumination fields at consecutive time periods are overlapped; and the sub-fields of the consecutive illumination fields are interlaced. In other words, the color illumination sub-fields in the next illumination field are substantially aligned to the blank sub-fields in the previous illumination field.

The movement of the illumination field across the light valve pixel array is accomplished by the scanning element (108 in FIG. 1a). The scanning element can be implemented in many ways, such as a rotating transmissive or reflective polygonal mirror as schematically illustrated in FIG. 3a.

Figure 3A:

Referring to FIG. 3a, the polygonal mirror (124) has n reflective facets with each facet being specular or non-specular reflective with n being an integer larger than 2. A specular reflection is referred in reflecting incident light such that the reflected angle (the angle between the propagation path of the reflected light and the normal direction of the reflective surface reflecting the incident light) is equal to the incident angle (the angle between the propagation path of the incident light and the normal direction of the reflective surface).

The reflective polygonal mirror can comprise any desired materials. For example, the reflective polygonal mirror can comprise a plastic material with the surfaces coated by a light reflective material, such as aluminum, gold, silver, or many other suitable materials. For moving/rotating the polygonal mirror, the polygonal mirror can be mounted to a driving mechanism, such as a motor.

Figure 3B:
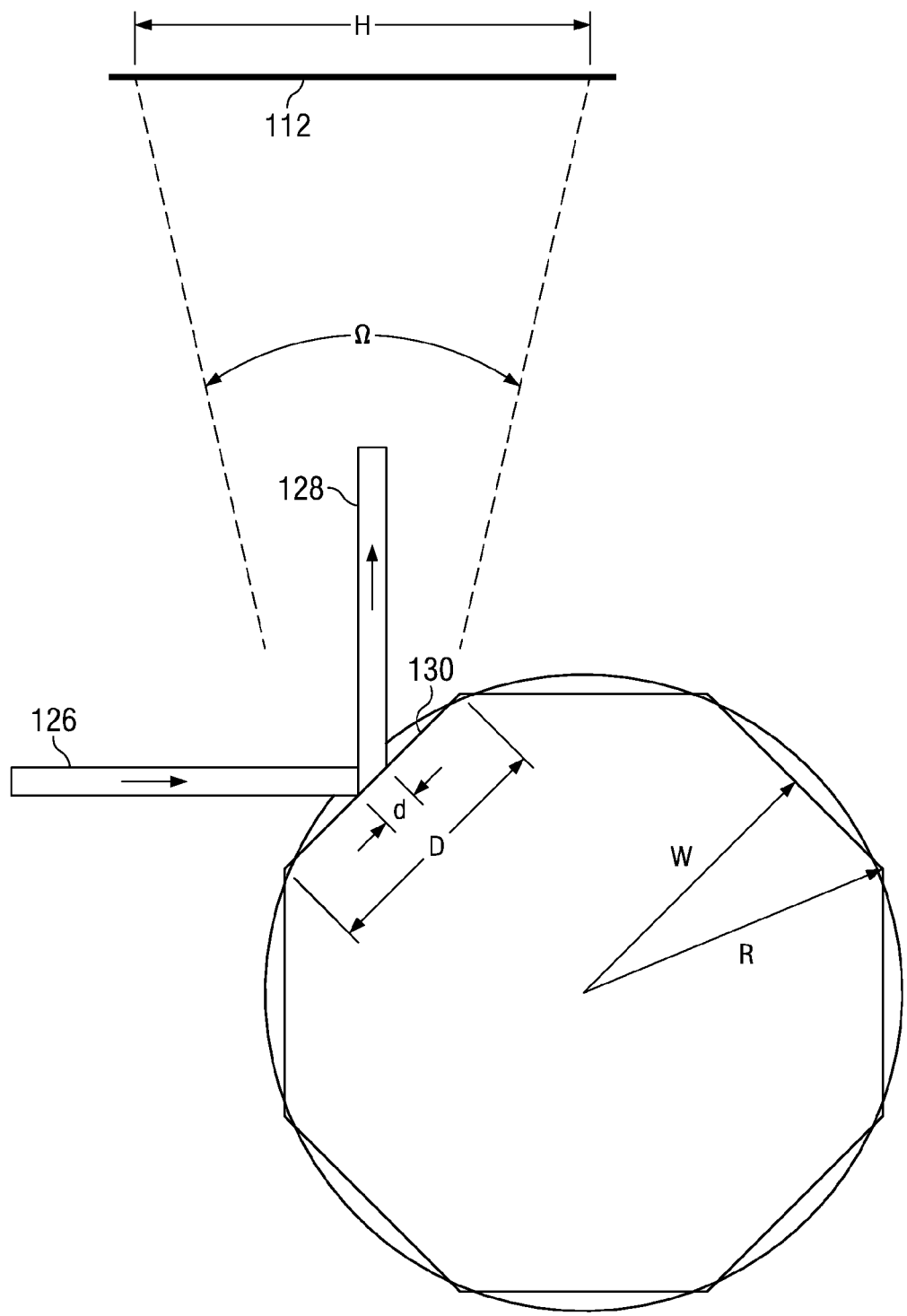

The polygonal mirror is aligned to the incident illumination light such that, when rotating along a rotation axis passing through the major axis (center) of the polygon, the reflective facets sequentially intercept the incident illumination light and reflecting the illumination light onto the light valve pixel array, which is better illustrated in FIG. 3b.

Referring to FIG. 3b, a cross-section perpendicular to the reflective facets of the polygonal mirror is schematically illustrated therein. The polygon in this example is a regular polygon with n facets, apothem W, and radius R that is measured as the radius of the circumcircle of the polygon. Each reflective facet of the polygon is represented by an edge, such as edge 130 in the cross-section. Each reflective facet has a width D. The rotation axis of the polygon passing through the center of the cross-section and pointing outwards from the paper.

Light from the illuminators (and the beam shaping element if provided) as illustrated in FIG. 1a is incident to a reflective facet of the polygon. The incident illumination light (126) generates an illumination field with a dimension of d on the facet. The illumination field on the facet is similar to the illumination field (114) as discussed above with reference to FIG. 1b and FIG. 2a depending upon the specific configuration of the illuminators and the beam shaping element (if provided). The incident illumination light on the facet is reflected by the facet towards the light valve. As the polygon rotates, the facet changes its position relative to the incident illumination light; and the incident angle of the incident illumination light to the facet is changed accordingly. As a consequence, the reflected angle (between the reflected light and the normal direction of the facet) is changed, resulting in the propagation path of the reflected light (128) from the reflective facet moving with the facet and sweeping through a certain spatial angle (referred to as scan angle) Ω. The spatial angle Ω corresponds to the height (H) of the light valve pixel array (112) to be scanned. In other words, during the period wherein a facet intercepts the incident illumination light from one end (edge of a facet) to the opposite end of the side (the opposite edge of the facet), the reflected light moves from the top row of the image area to the bottom row of the pixel array once. As the next facet starts to intercept the incident light, the reflected light resumes its position at the top of the light valve pixel array and the scan process repeats. It can be seen that the moving speed of the illumination field on the light valve pixel array (112) is determined by the size of the facet, which is related to the number of reflective facets, and the rotation speed of the polygon, wherein the moving speed is defined as the number of rows of the image area being illuminated per-second.

The optical performance of the polygonal mirror can be characterized by many factors, one of which is duty cycle that is defined as 1-d/D. When the illumination area d on the facet is large, a corner of the polygon may intercept the incident light for a time period, resulting in the top and bottom portions of the light valve pixel array being illuminated simultaneously; while the middle portion of the light valve pixel array may not be illuminated. Obviously, this time period is not usable for image processing or image displaying; and will be discarded. Such discarded time period degrades the efficiency of the imaging system. Therefore, it is preferred to reduce the illumination area d, which resulting in a larger duty cycle. Improved duty cycles can also be obtained by larger diameters D.

Figure 3C:
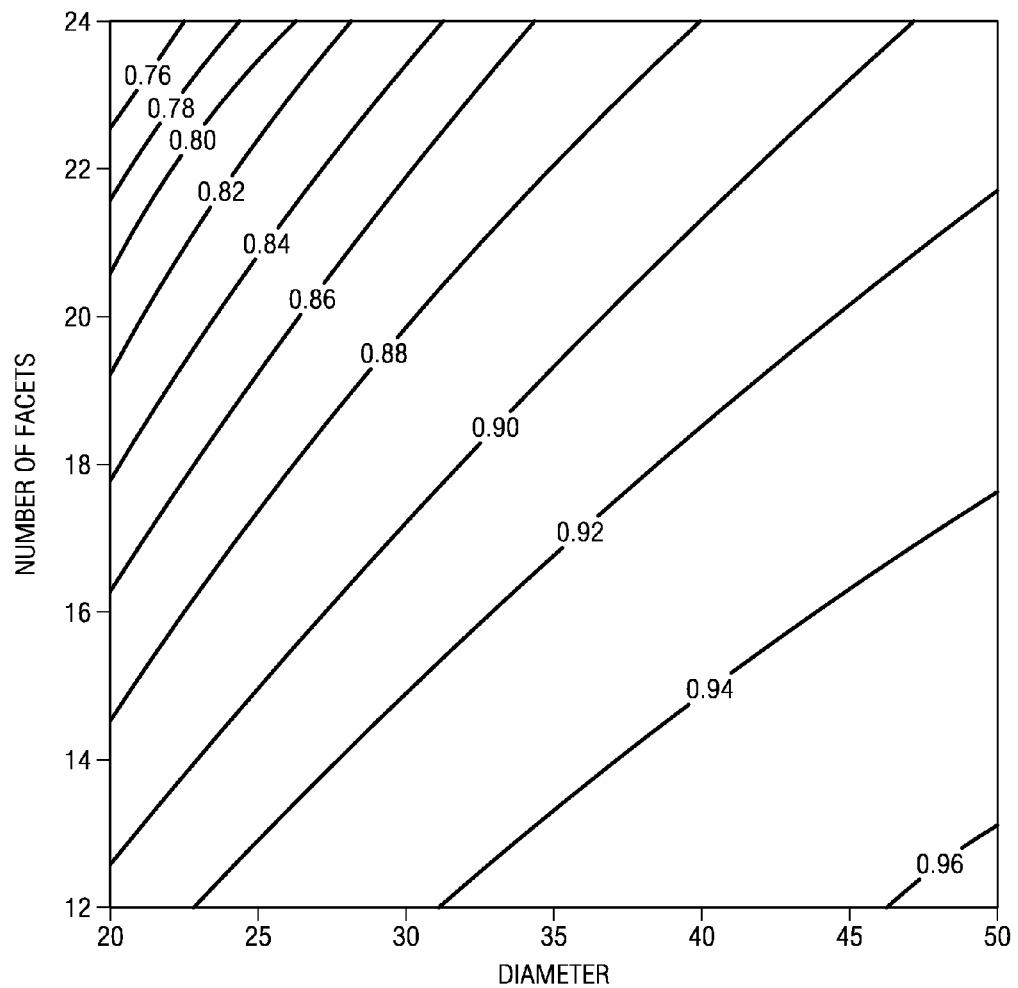
FIG. 3c presents a diagram of duty cycle versus diameter and number of facets of a reflective polygonal mirror structure.

The optical efficiency and the performance of the polygonal mirror can be optimized through other factors, such as polygon size and the total number of reflective facet. In terms of cost, lower number of facets and smaller size of polygonal mirror are desired. However, because the polygonal mirror is often used with other optical elements, such as f-theta lenses, a polygonal with a lower number of facets may cause a larger scan angle, which in turn, complicates design and manufacturing of the associated optical elements, especially the f-theta lens. FIG. 3c presents a diagram showing the relationships of the duty cycle, the number of reflective facets, and the diameter of the polygon based on a typical high power laser source used in existing rear-projection television (TV).

Referring to FIG. 3c, the horizontal axis plots the diameter in millimeter; and the vertical axis plots the number of reflective facets. Lines in the diagrams draw different duty cycles; and the in-line number in each line shows the value of the duty cycle. For example, a polygon mirror with 28 mm diameter and 14 facets has a duty cycle of 0.92. For any given image processing systems, it is preferred that the polygonal mirror has a duty cycle of 0.25 or higher, 0.8 or higher, more preferably 0.85 or higher, 0.9 or higher, or 0.95 or higher. The polygonal mirror may have any desired number of facets; and preferably from 3 to 50 facets, and more preferably from 10 to 30 facets, and more preferably around 20 facets. The polygonal mirror may have a diameter from 10 to 60 mm, and more preferably from 20 to 50 mm, from 30 to 45 mm, and more preferably around 40 mm. Of course, other polygonal mirrors with different numbers of facets, diameters, and duty cycles are also applicable.

It can be seen from the above discussion that larger polygonal mirror (larger D or smaller d) favors duty cycle; while smaller polygonal mirror (smaller D or larger d) favors optical elements/architectures and smaller scanning angle. In practice, the size of the polygonal mirror is preferably selected to balance the duty cycle, scanning angle, optical element(s)/optical architecture, and cost.

It is noted that the polygonal mirror as discussed above is regular polygon. Other polygons are also applicable. For example, a polygonal mirror having n facets of different sizes is also applicable. A reflective facet may have fine structures, such as reflective grooves, trenches, and ridges such that the reflective facets can or may not be specular. Regardless of different structures and configurations of polygonal mirrors, a reflective polygonal mirror is provided on which the illumination light from the illuminators is focused. The reflected light from the reflective facets of the polygonal mirror is projected on to the light valve pixel array and swept through the light valve pixel array so as to illuminate the pixel array. It is noted that the reflected light from the reflective facets of the polygonal mirror may not be focused (converged or condensed) to the light valve pixel array. In other words, the illumination field on the light valve pixel array target caused by the reflective light from a reflective facet may have an illumination area equal to or larger than the illumination area on the reflective facet caused by the illumination light. As compared to existing systems employing refractive polygonal mirrors, such as printers, polygonal mirrors in this disclosure is designed to sweep through a smaller scanning angle because the target is relatively smaller especially when the target is a light valve (e.g. with a typical size from 10 to 20 mm). Existing printers employing rotating polygonal mirrors are configured to scan a larger area (e.g. a paper with 11" length) with a high resolution (e.g. 2000 dots-per-inch). In contrast, resolution of the illumination fields on the targets (e.g. light valves) may not be a major concern of the polygonal mirror designs in this disclosure. This arises from the fact that the illumination field(s) projected on the target is to illuminate a group of target pixels (e.g. light valve pixels). As an example as illustrated in FIG. 1b and FIG. 2a, the illumination field(s) on the target can have a resolution of as low as 0.5 to 1 mm or from 20-50 dot-per-inch in lateral and traversal directions.

As discussed above, a larger duty cycle is preferred (though not required). An improved duty cycle can be accomplished in many ways, one of which is by using a f-theta lens, as schematically illustrated in FIG. 4.

Figure 4:
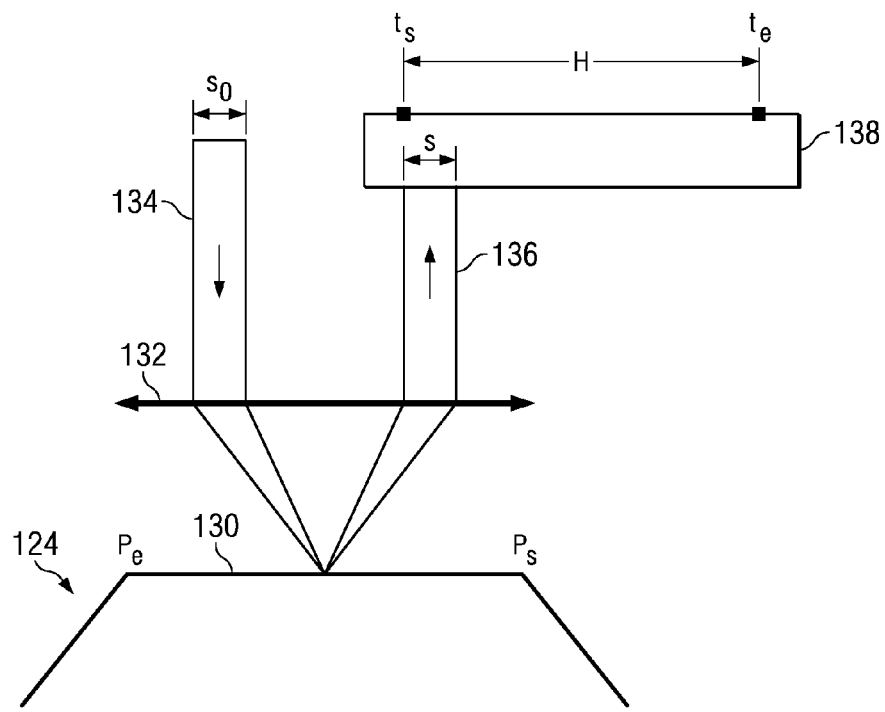
FIG. 4 schematically illustrates an exemplary optical architecture for causing an illumination field and moving the illumination field across the target.

Referring to FIG. 4, f-theta lens 132 can be disposed between the illuminator and the polygonal mirror (124). For simplicity and demonstration purposes, only one facet (130) of the polygonal mirror is illustrated herein. The reflective facet (130) can be disposed at a focal plane of the f-theta lens.

Incoming illumination light 134 is incident to reflective facet 130 through f-theta lens 132 that converges the incident illumination light (134) to an illumination area with a smaller size as compared to the dimension of the illumination before the f-theta lens so as to reduce the illumination area d on the facet (130). The incident illumination light is then reflected into reflected light 136 by the facet (130) to light valve pixel array 138 through f-theta lens 132. As such, single f-theta lens is used for both imaging the illumination light from the illuminator to the facet; and imaging the illumination area on the facet to the light valve pixel array. It is noted that an f-theta lens may be an optical assembly comprising multiple optical lens components. These lens components may or may not all be used in both condensing the light to the facets and projecting the reflected light onto the light valve pixel array. The f-theta lens (132) can be replaced by or used with many other optical elements, such as an optical lens.

During an application, the polygonal mirror is rotated; and the reflective facet (130) moves relative to the propagation path of the incident illumination light. The illumination area on reflective facet 130 sweeps through the facet from one edge $P_s$ to the opposite edge $P_e$. As a consequence, reflected light 136 sweeps through the image area (138) from one side $t_s$ to the opposite side $t_e$ that is distanced H away from side $t_s$. The reflected light (136) has a width s, as discussed above with reference to FIG. 1a and FIG. 2a; and s may or may not be equal to the size $s_0$ of the incident light.

Figure 5:
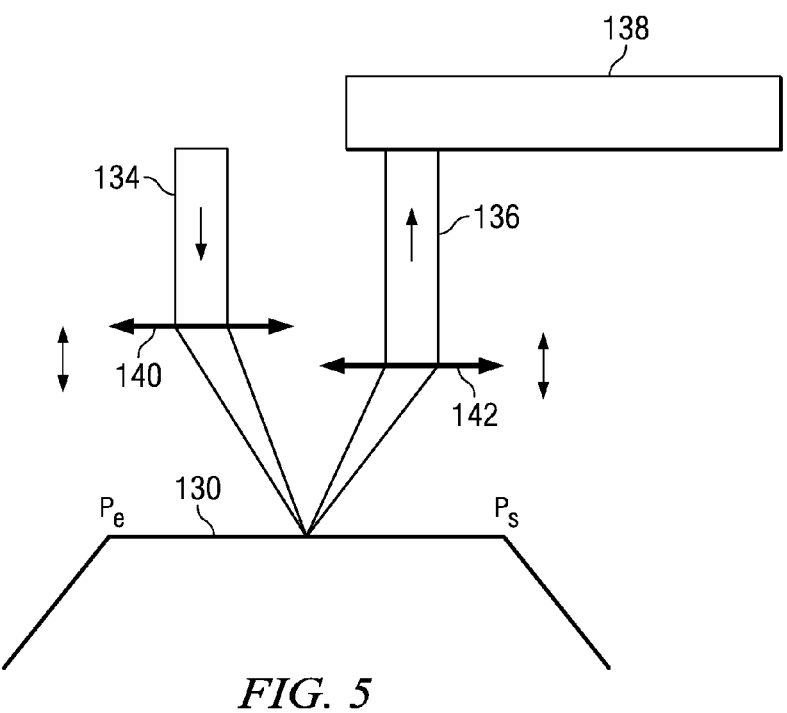
FIG. 5 schematically illustrates another exemplary optical architecture for causing an illumination field and moving the illumination field across the target.

In another example, the f-theta lens (132) can be replaced by multiple f-theta lenses with one for imaging the incident light onto the facets and another one for imaging the illumination areas on facets to the image area on the light valve pixel array, as schematically illustrated in FIG. 5.

Referring to FIG. 5, f-theta lens 140 is disposed between facets of the polygonal mirror and the illuminator such that the facets are substantially at a focal plane of f-theta lens 140. f-theta lens 142, which may or may not have the same focal length, is disposed between the facets and the target (138). As an alternative feature, each one or both of f-theta lenses 140 and 142, can be attached to a moving mechanism such that the f-theta lens(es) is movable along the propagation path(s) of the illumination light relative to the facets. It is noted that either one or both of the f-theta lenses (140 and 142) can be replaced by or used with another optical element, such as an optical lens.

Illumination light 134 from the illuminator is converged onto facets (e.g. facet 130) through f-theta lens 140. The illumination area on the facet formed by the incident illumination light is imaged to the light valve pixel array 138 through f-theta lens 142. As the polygonal mirror rotates, the illumination area generated by the incident illumination light (134) and f-theta lens 140 sweeps through the reflective surface of each facet; and the reflected light (136) from the facets and through f-theta lens 142 moves across light valve pixel array 138.

In color image processes, such as color image displaying applications, a set of color fields, such as that discussed above with reference to FIG. 2a, is generated to sequentially illuminate the light valve pixels. The set of color illumination subfields is moved across the light valve pixel array so as to sequentially illuminate the light valve pixel array. Accordingly, the illumination sub-fields generated by the illumination light of different colors on each reflective facet are desired to be spatially separated. This casts a problem that the light of different colors is not telecentric. On the other hand, in order to obtain a high duty cycle on the polygonal mirror, it is expected that each illumination sub-fields generated by a color light has a small angular divergence. The above two problems together may cause a non-uniform pupil filling of the projection lens that is often provided for projecting the modulated light from the light valve onto a screen of a display system. This problem can be solved by using a relay lens between the polygonal mirror and the light valve, as well as a stack of dichroic filters, as schematically illustrated in FIG. 6.

Figure 6:
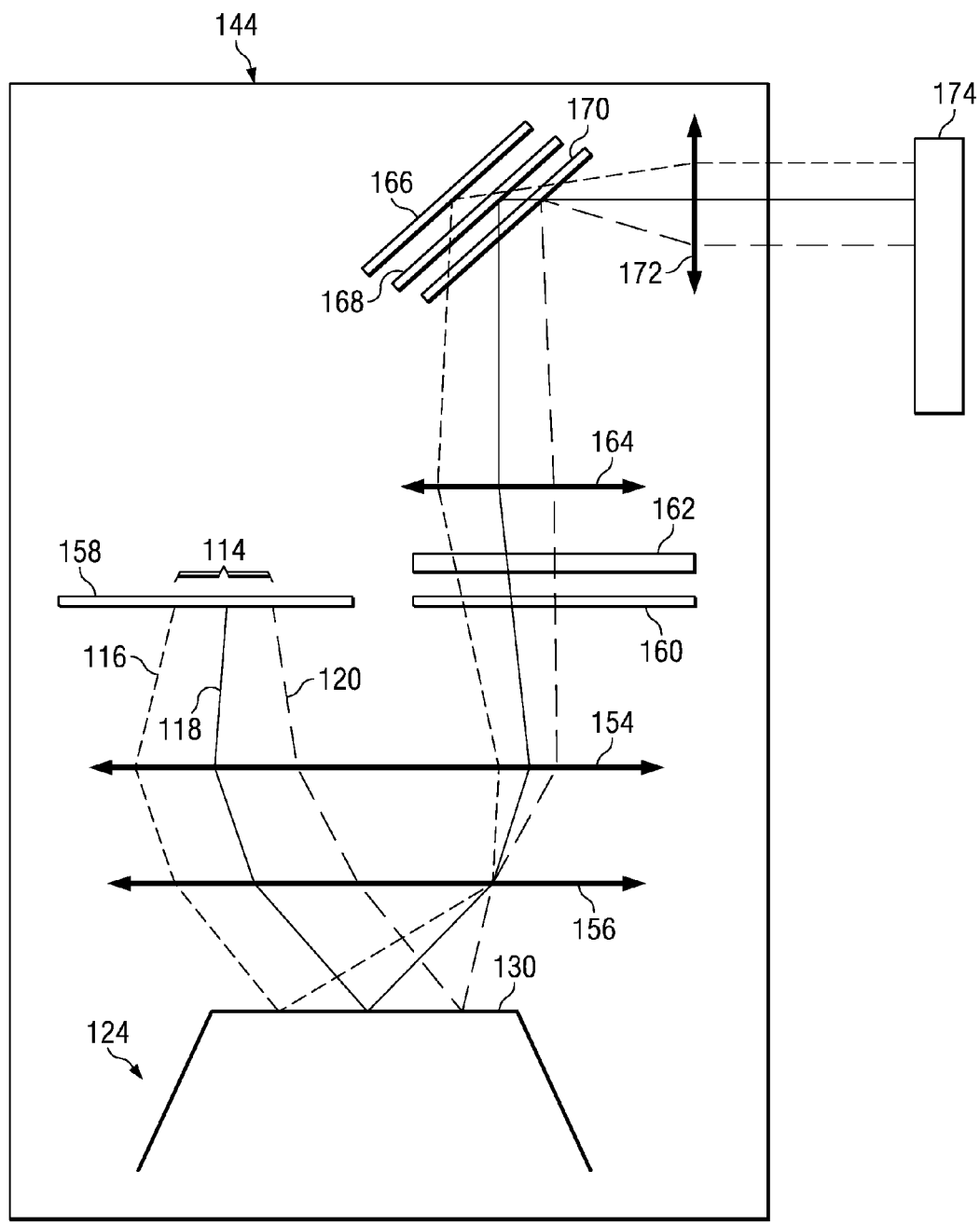
FIG. 6 schematically illustrates an exemplary optical architecture for causing an illumination field having multiple colors and moving the illumination field across the target.

Referring to FIG. 6, the display system comprises illumination system 144 and light valve 174 that comprises an array of individually addressable pixels in this example. The illumination system comprises polygonal mirror 124 having a plurality of reflective facets. For simplicity purpose, only one reflective facet 130 is illustrated, but the polygonal mirror may have any suitable number of reflective facets, as discussed above.

Lens 154 and 156 together form an f-theta lens. In general, any suitable number of lenses can be used to form an f-theta lens depending upon the desired scanning scheme, such as linearity and amplitude of the scanning, as well as other factors, such as the quality of the produced image by the light valve in a display system. The f-theta lens (lens 154 and 156) is disposed between the polygonal mirror and the illuminator (not shown for simplicity purpose) and the light valve (174) such that the illuminator and the light valve are on the same side of the f-theta lens; while the polygonal mirror is on the opposite side of the f-theta lens. With this configuration, the f-theta lens is employed for both converging the illumination light (from the illuminator) to the facets of the polygonal mirror and imaging the illumination areas on the facets to the light valve. The f-theta lens is disposed such that the reflective facets are substantially at the focal plane of the polygonal mirror.

Figure 7A:
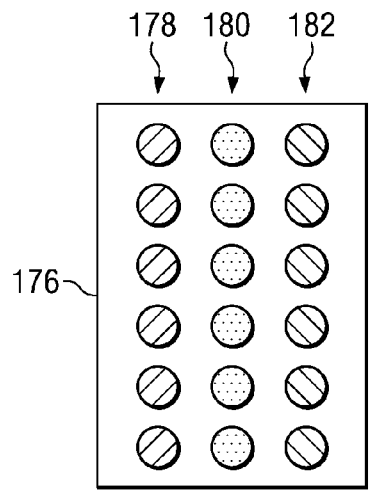
FIGS. 7a and 7b schematically illustrates the illumination field at the entrance of the optical architecture in FIG. 6.

Illumination light 114, which comprises light of different colors 116, 118, and 120, is emitted from illuminator(s) of the illumination system. In one example, the illumination light (114) is generated by a matrix of illuminators, as schematically illustrated in FIG. 7a. Referring to FIG. 7a, illuminator matrix 176 comprises illuminator arrays 178, 180, and 182. Each illuminator array is composed of solid-state illuminators (e.g. laser sources) capable of emitting substantially the same color light. For example, illuminators arrays 178, 180, and 182 can be provided for respectively emitting red, green, and blue color light. It is appreciated by those skilled in the art that FIG. 7a is for demonstration purpose only, and should not be interpreted as a limitation. Other variations are also applicable. For example, each illuminator array may comprise any desired number of illuminators; and each matrix may comprise any number of illuminators arrays of different color combinations depending upon the specific configuration of the imaging system, as discussed above with reference to FIG. 2a. Corresponding to different expected illumination field combinations on the light valve, the illuminator matrix may comprise arrays of illuminators emitting different color light, such as red, green, blue, and other colors. Secondary colors, such as yellow, cyan, and magenta, and white can also be provided by properly combining and operating illuminators emitting single colors. Illuminator arrays of the same and/or different color light can be arranged in the illuminator matrix in many different ways.

Figure 7B:
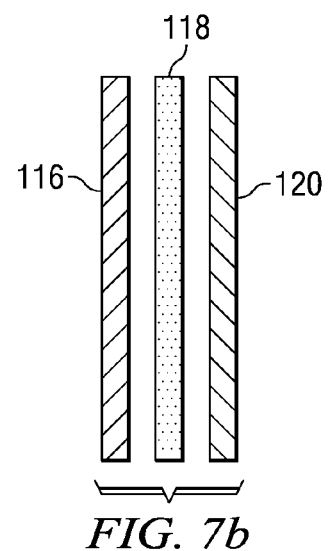

The illumination light from the illuminator matrix can be modified based on the desired scanning scheme for scanning/illuminating the light valve. For example, if it is desired that the illumination field on the light valve is substantially a strip, as discussed above with reference to FIG. 1a and FIG. 2a, a beam shaping optical element (e.g. 106 in FIG. 1) can be used to modify the collective light from each array (e.g. a straight array) by homogenizing the light from the illuminator array and shaping the light into the desired pattern, such as straight strips as discussed above with reference to FIG. 2a. FIG. 7b schematically illustrates the near—field illumination pattern of the illumination light at plane 158 as shown in FIG. 6.

Referring to FIG. 7b, the near-field illumination pattern comprises illumination fields 116, 118, and 120 respectively corresponding to the light emitted from illuminator arrays 178, 180, and 182 of illuminator matrix 176 in FIG. 7a. The illumination pattern may have the same property as illumination field 114 as discussed above with reference to FIG. 2a and FIG. 2b, which will not be repeated herein.

Referring again to FIG. 6, illumination light 116, 118, and 120 are incident to a reflective facet, such as facet 130, of rotating polygonal mirror through the f-theta lenses (comprising lens 154 and 156); and respectively generate illumination sub-fields on the reflective facet. The illumination sub-field can be those as discussed above with reference to FIG. 2a and FIG. 2b. The illumination sub-fields on the facet are spatially separated as illustrated in FIG. 6. The illumination light is then reflected by the reflective facet; and passes through the f-theta lens (comprising lens 154 and 156). The near-field and far-field illumination pattern of the reflected light after the f-theta lenses at plane 160 are schematically illustrated in FIG. 8a and FIG. 8b.

Figure 8A:
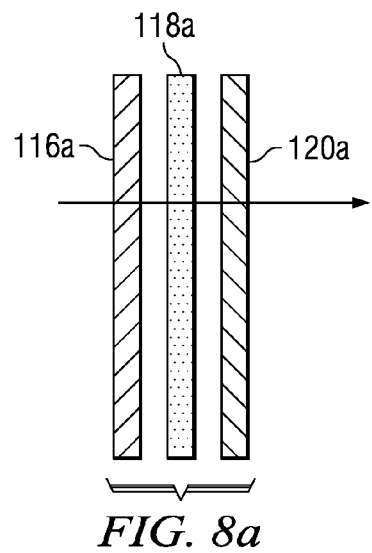
FIGS. 8a and 8b schematically illustrates near-field and far-field illumination profiles at a location between the polygonal mirror structure and the target in the optical architecture in FIG. 6.

Referring to FIG. 8a, illumination sub-fields 116a, 118a, and 120a correspond to the illumination sub-fields 116, 118, and 120 in FIG. 7b, respectively. However, the illumination sub-fields 116, 118, and 120 in FIG. 7b are spatially static; while illumination sub-fields 116a, 118a, and 120a in FIG. 8a are spatially moving during to the rotation of the reflective facet of the rotating polygonal mirror.

Figure 8B:
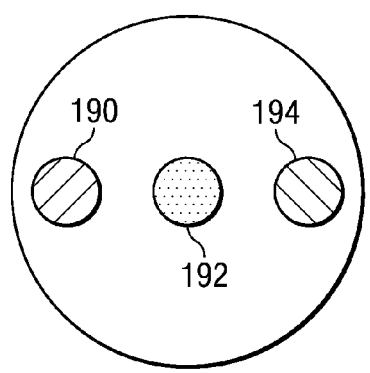

Referring to FIG. 8b, the far-field illumination pattern of the reflected light from the facet of the polygonal mirror comprises circular illumination sub-fields 190, 192, and 194 corresponding to the near field illumination sub-fields 116a, 118a, and 120a, respectively. The far field illumination sub-fields 190, 192, and 194 are spatially separated, which may reduce the optical efficiency of the system. This problem can be solved by an optical diffuser and one or more relay lenses.

Referring again to FIG. 6, the reflected light after f-theta lenses 154 and 156 is directed to movable diffuser 162. The movable diffuser can be any suitable optical diffusers, such as bulk- or surface-engineered optical diffusers for spreading each color light so as to substantially fill the pupil of the projection optical element at far field. The movement of the optical diffuser can be accomplished by attaching the optical diffuser to a moving mechanism that is capable of rotating and/or vibrating the optical diffuser.

The reflected light after the optical diffuser is projected to a stack of dichroic filters 166, 168, and 170 through relay optical element 164; wherein the stack of dichroic filters is substantially disposed at the far-field of relay optical element 164. The dichroic filters are disposed such that the reflected light of different colors from the dichroic filters are overlapped at far field, such as at the location of the screen, on which the modulated light from the light valve (174) are projected. An exemplary far field illumination pattern of the reflected light after the stack of dichroic filters is schematically illustrated in FIG. 9b.

Figure 9A:
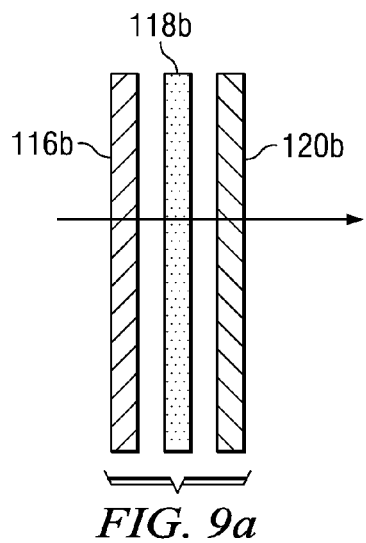
FIGS. 9a and 9b schematically illustrates near-field and far-field illumination profiles at the light valve location in the optical architecture in FIG. 6.
Figure 9B:
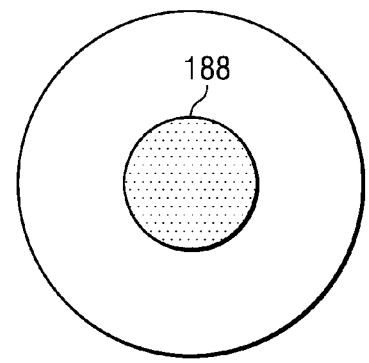

As can be seen in FIG. 9b, the modulated light of different colors from the light valve (174) is overlapped so as to form a substantially uniform illumination pattern 188 at the pupil of the projection lens that projects the modulated light onto the screen or at the location of the screen.

Referring again to FIG. 6, the reflected light after the stack of dichroic filters is incident onto the light valve (174) through relay lens 172. At the light valve, the reflected light from the stack of dichroic filters forms the desired illumination fields, as schematically illustrated in FIG. 9a.

Referring to FIG. 9a, illumination sub-fields 116b, 118b, and 120b corresponding to the illumination sub-fields 116a, 118a, and 120a in FIG. 8a, are generated at the light valve. The generated illumination sub-fields 116b, 118b, and 120b moves along the desired directions across the light valve pixels so as to sequentially illuminating the light valve pixels. The light valve pixels modulate the illumination light in each illumination sub-field according to image data (e.g. bitplane data) associated with the desired image to be produced on the screen. The modulated light from the light valve pixels is then projected to the screen of the system to present the desired image.

With the above optical architecture, the illumination light of different colors from the illuminators can be projected to the light valve simultaneously, which in turn allows for the illuminators being operated continuously. Because all light from the illuminators can arrive at the screen simultaneously with substantially no light being blocked, the brightness of the produced images on the screen can be significantly larger than that in existing display systems wherein light of different colors are sequentially incident to the light valve and only one color light is incident to the light valve at a time. As an example, a display system with an optical architecture as discussed above with reference to FIG. 1a and FIG. 4 through FIG. 6 may produce an image with a brightness that is 1.5 times or more, 2 times or more, 3 times or more, 4 times or more, 5 times or more of the brightness of the image produced by an display system that uses the same set of illuminators but operates the illuminators such that the light of different colors are sequentially (not simultaneously) incident to the light valve. The maximum gain in brightness due to the optical architecture as discussed above in this disclosure can be equal to the number of illuminators used in the display system. As an example wherein three illuminators are provided for providing red, green, and blue colors, the maximum gain of the brightness of the produced image on the screen can be 3 times or more of the maximum brightness achievable with a sequential color illumination technique. The maximum gain increases as the number of illuminators increases with the optical architecture of this disclosure.

Figure 10:
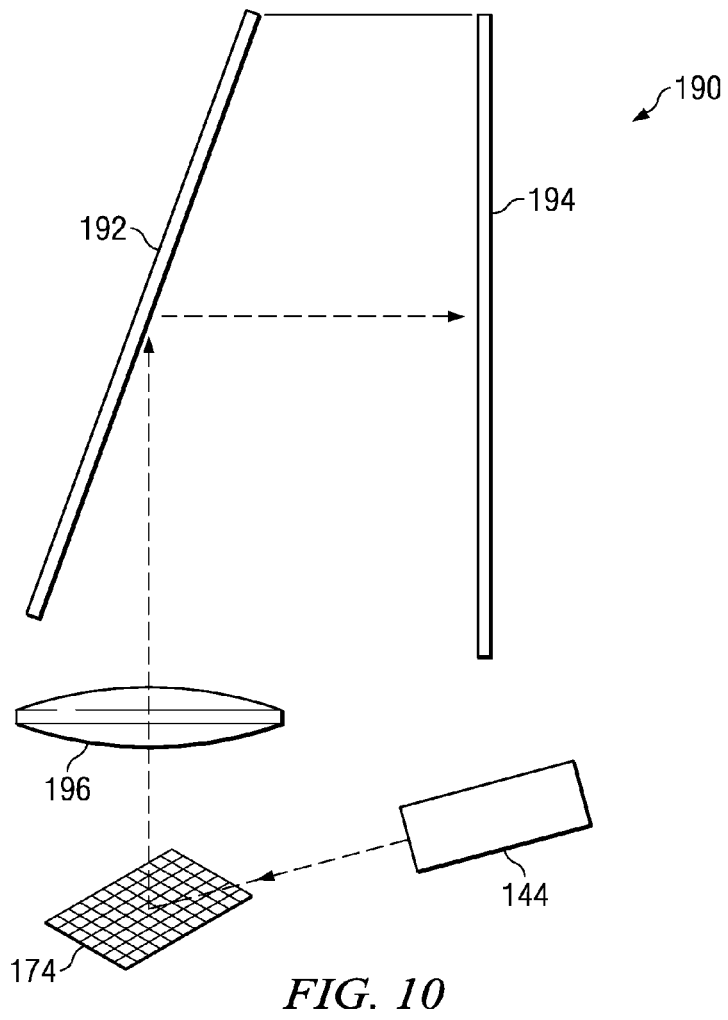
FIG. 10 schematically illustrates an exemplar rear-projection system having an optical structure of this disclosure.

As a way of example, FIG. 10 schematically illustrates an exemplary rear-projection system, such as a rear-projection TV that employs an optical architecture as discussed above.

Referring to FIG. 10, the rear-projection system (190) comprises illumination system 144 for providing illumination light. The illumination system (144) can be the same as that discussed above with reference to FIG. 6. The illumination light from the illumination system is incident to light valve 174 and illuminates the pixels of the light valve (174) in a way as discussed above with reference to FIG. 6. The light valve pixels modulate the incident light according to image data (e.g. bitplane data) derived from the desired image to be produced. The modulated light is then directed to a folding mirror (192) through optical element 196 that spreads the modulated light from the light valve across the reflecting area of the folding mirror (192). The folding mirror projects the modulated light onto a translucent screen (194) so as to present the desired image on the translucent screen.

Figure 11:
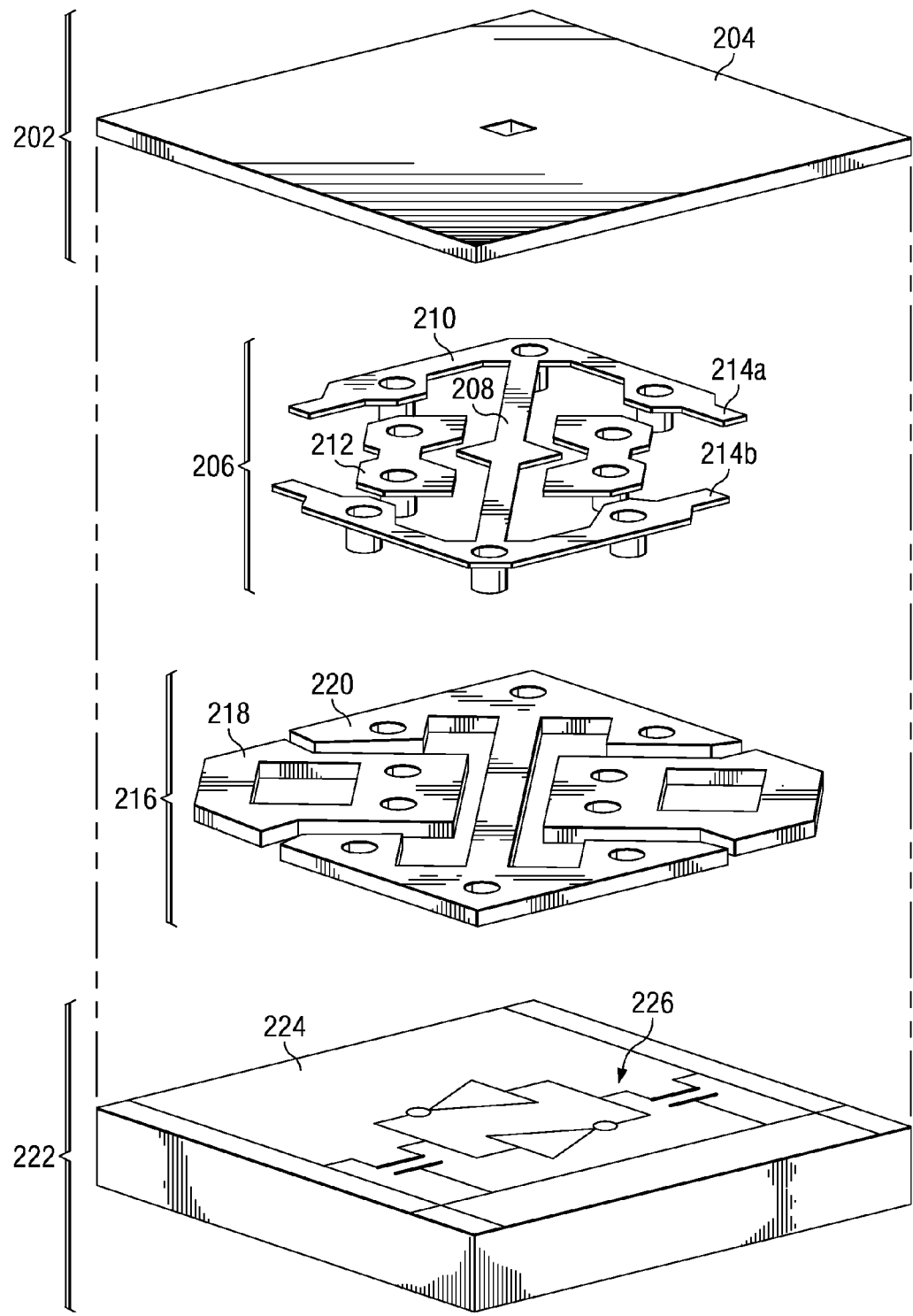

As discussed above, the light valve may comprise any suitable type of pixels, one of which is reflective and deflectable micromirror devices. FIG. 11 schematically illustrates an exemplary reflective and deflectable micromirror device.

Referring to FIG. 11, the micromirror device comprises substrate layer 222 in which substrate 224 is provided. Substrate 224 can be any suitable substrates, such as semiconductor substrates, on which electronic circuits (e.g. circuits 226) can be formed for controlling the state of the micromirror device.

Formed on substrate layer 222 can be electrode pad layer 216 that comprises electrode pad 218 and other features, such as electronic connection pad 220 that electrically connects the underlying electronic circuits to the above deformable hinge and mirror plate. Hinge layer 206 is formed on the electrode pad layer (216). The hinge layer comprises deformable hinge 208 (e.g. a torsion hinge) held by hinge arm 210 that is supported above the substrate by hinge arm posts. Raised addressing electrodes, such as electrode 212 is formed in the hinge layer (206) for electrostatically deflecting the above mirror plate. Other features, such as stopper 214a and 214b each being a spring tip, can be formed in the hinge layer (206). Mirror plate layer 202, which comprises reflective mirror plate 204 attached to the deformable hinge by a mirror post, is formed on the hinge layer (206).

FIG. 11 schematically illustrates one of many possible micromirror devices. In other examples, the micromirror device may comprise a light transmissive substrate, such as glass, quartz, and sapphire, and a semiconductor substrate formed thereon an electronic circuit. The light transmissive substrate and the semiconductor substrate are disposed proximate to each other leaving a vertical gap therebetween. A reflective mirror plate is formed and disposed within the gap between the light transmissive and semiconductor substrates. In another example, the reflective mirror plate can be in the same plane of the light transmissive substrate and derived from the light transmissive substrate.

It will be appreciated by those of skill in the art that a new and useful optical architecture having an optical scanning mechanism for causing an illumination field on a target and moving the illumination field across the target has been described herein. In view of the many possible embodiments, however, it should be recognized that the embodiments described herein with respect to the drawing figures are meant to be illustrative only and should not be taken as limiting the scope of what is claimed. Those of skill in the art will recognize that the illustrated embodiments can be modified in arrangement and detail. Therefore, the devices and methods as described herein contemplate all such embodiments as may come within the scope of the following claims and equivalents thereof.

I claim:

1. A method of producing an image, comprising:
providing a light with first and second light components of different colors;
directing said light to a reflective facet of a movable cylinder and reflecting, by said reflective facet, the light toward a light valve so as to illuminate the light valve with said light, wherein said light valve comprises an array of individually addressable pixels, and wherein the directing is performed by converging said light to a focal point at the reflective facet;
moving the reflective facet so as to move said light across the light valve for illuminating the light valve pixel array; and
causing the light to propagate toward or away from a display target by the individually addressable pixels so as to produce an image on the display target.

2. The method of claim 1, wherein the first and second light components are laser light; and wherein the pixels of the light valve are reflective and deflectable micromirrors or liquid-crystal-on-silicon pixels.

3. The method of claim 1, wherein said illumination light causes an illumination field on the light valve; and wherein the illumination field has a dimension along the moving direction; and wherein the dimension is from $1/500$ to $1/2$ of a distance that the illumination field moves to cover substantially the entire light valve pixel array.

4. The method of claim 3, wherein the dimension is from $1/50$ to $1/2$ of the distance.

5. The method of claim 3, wherein the illumination field has a substantially uniform intensity distribution along a direction perpendicular to the moving direction.

6. The method of claim 1, wherein said first and second light components cause first and second illumination sub-fields on the light valve; and wherein the first and second illumination fields are spaced by an area substantially without the light.

7. The method of claim 1, further comprising:
generating the illumination field on the light valve to illuminate a first group of light valve pixels at a first time;
modulating the first and second light components by the first group of light valve pixels at the second time;
moving the illumination field on the light valve to illuminate a second group of light valve pixels at a second time; and
modulating the first and second light components by the second group of light valve pixels at the second time.

8. The method of claim 1, wherein the step of moving said light across the light valve further comprises:
directing the first and second light components to a reflective facet of a rotating polygonal mirror of the reflective cylinder.

9. The method of claim 8, wherein the first or the second light component generates an illumination field on the reflective facet of the polygonal mirror; and wherein said illumination field on the facet has a characteristic dimension d such that a duty cycle defined as $(1-d/D)$ is 25% or more with D being the width of the reflective facet.

10. The method of claim 9, wherein the duty cycle is 90% or more.

11. The method of claim 8, wherein the first and second light components are incident to the reflective facet through an optical element; and are incident to the light valve through the same optical element.

12. The method of claim 8, wherein the first and second light components are incident to the light valve through an optical diffuser that is disposed between the polygonal mirror and the light valve.

13. The method of claim 12, wherein the first and second light components are incident to the light valve through a stack of dichroic filters that is disposed between the optical diffuser and the light valve.

14. A display system, comprising:
a light valve comprising an array of individually addressable pixels; and
an illumination system for sequentially illuminating the pixels of the light valve, further comprising:
first and second illuminators for simultaneously providing first and second light components; and
a polygonal mirror comprising a movable reflective facet coupled to the first and second illuminators for generating first and second illumination sub-fields on the light valve and moving the first and second illumination sub-fields across the light valve, wherein the polygonal mirror is located at a focal point of the first and second light components.

15. The system of claim 14, wherein the first and second illuminators are laser sources.

16. The system of claim 14, wherein the first illuminator is a member of a first array of illuminators, each illuminator being capable of emitting light of substantially the same color of the first light component; and wherein the second illuminator is a member of a second array of illuminators, each illuminator being capable of emitting light of substantially the same color of the second light component.

17. The system of claim 16, further comprising:
an optical element disposed between the illuminators and the polygonal mirror such that the first and second light components are incident to the polygonal mirror from the illuminators and incident to the light valve from the polygonal mirror through said optical element.

18. The system of claim 17, further comprising:
an optical diffuser disposed between the polygonal mirror and the light valve or a stack of dichroic filters disposed between the polygonal mirror and the light valve.

19. A method of displaying an image on a screen, comprising:
providing light;
focusing the light onto a movable mirror that reflects the light using an optical element;
projecting the reflected light from the movable mirror onto a light valve by said optical element;
moving the reflected light from the movable mirror across the light valve so as to sequentially illuminate the light valve pixels; and
causing the light to propagate toward or away from a display target by the individually addressable pixels so as to produce an image on the display target.

20. The system of claim 19, wherein the light is laser light provided by a laser source.

* * * * *